US012248554B2

(12) United States Patent
S et al.

(10) Patent No.: US 12,248,554 B2
(45) Date of Patent: Mar. 11, 2025

(54) SYSTEMS, METHODS, AND APPARATUSES FOR IMPLEMENTING AND AUTHENTICATING VIRTUAL RESOURCE TRANSFER DEVICES COMPRISING ELECTRONIC DATA RECORDS IN A DISTRIBUTED NETWORK

(71) Applicant: BANK OF AMERICA CORPORATION, Charlotte, NC (US)

(72) Inventors: Suriyanath S, Chennai (IN); Rohan Vijayvergia, Rajasthan (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 235 days.

(21) Appl. No.: 17/966,100

(22) Filed: Oct. 14, 2022

(65) Prior Publication Data
US 2024/0126858 A1  Apr. 18, 2024

(51) Int. Cl.
*G06F 21/33* (2013.01)

(52) U.S. Cl.
CPC .................... *G06F 21/33* (2013.01)

(58) Field of Classification Search
CPC ........................................ G06F 21/33
See application file for complete search history.

(56) References Cited

U.S. PATENT DOCUMENTS

| | | |
|---|---|---|
| 5,455,407 A | 10/1995 | Rosen |
| 5,659,165 A | 8/1997 | Jennings |
| 6,119,229 A | 9/2000 | Martinez |
| 8,037,193 B2 | 10/2011 | Hay |
| 9,229,987 B2 | 1/2016 | Mattsson |
| 10,540,654 B1 | 1/2020 | James |
| 11,054,901 B2 | 7/2021 | Peters |
| 11,075,891 B1 | 7/2021 | Long |
| 11,308,487 B1 | 4/2022 | Foster |
| 11,334,875 B2 | 5/2022 | Yantis |
| 11,522,700 B1 | 12/2022 | Auerbach |
| 2017/0103385 A1 | 4/2017 | Wilson, Jr. |
| 2017/0351852 A1* | 12/2017 | Bao ........................ H04W 4/02 |
| 2020/0226679 A1* | 7/2020 | Li ......................... G06F 16/2379 |
| 2021/0082044 A1* | 3/2021 | Sliwka ................... H04L 9/3255 |
| 2021/0203481 A1* | 7/2021 | Wright .................. H04L 9/0618 |
| 2021/0287195 A1 | 9/2021 | Prakash |
| 2022/0292588 A1 | 9/2022 | Collen |

(Continued)

FOREIGN PATENT DOCUMENTS

| | | |
|---|---|---|
| AU | 3146397 A | 1/1998 |
| CA | 3177552 A1 | 9/2022 |

(Continued)

*Primary Examiner* — Jason D Recek
(74) *Attorney, Agent, or Firm* — Moore & Van Allen PLLC; Lauren M. Stokes

(57) ABSTRACT

Systems, computer program products, and methods are described herein for implementing and authenticating virtual resource transfer devices comprising electronic data records in a distributed network. The present invention is configured to receive data associated with a virtual resource token owned by a user; determine a resource value of the virtual resource token; generate a virtual resource transfer device associated with the virtual resource token; and generate, based on the resource value of the virtual resource token, a resource transfer availability of the virtual resource transfer device.

19 Claims, 9 Drawing Sheets

(56) References Cited

U.S. PATENT DOCUMENTS

| | | | |
|---|---|---|---|
| 2022/0294629 A1 | 9/2022 | Collen | |
| 2022/0294630 A1 | 9/2022 | Collen | |
| 2023/0137867 A1* | 5/2023 | Walters | H04L 9/3297 |
| | | | 705/75 |

FOREIGN PATENT DOCUMENTS

| | | | |
|---|---|---|---|
| KR | 102388302 B1 | 4/2022 | |
| KR | 102475823 B1 | 12/2022 | |

* cited by examiner

SYSTEMS, METHODS, AND APPARATUSES FOR IMPLEMENTING AND AUTHENTICATING VIRTUAL RESOURCE TRANSFER DEVICES COMPRISING ELECTRONIC DATA RECORDS IN A DISTRIBUTED NETWORK

FIELD OF THE INVENTION

The present invention embraces a system for implementing and authenticating virtual resource transfer devices comprising electronic data records in a distributed network.

BACKGROUND

Users in a virtual environment and in a distributed network have a harder time than ever easily keeping track and transferring their resources between providers both in a real-world and in a virtual environment. For instance, users and consumers may use real-world resource transfer devices provided by specific entities, where the specific entities do not allow the transferability of rewards and benefits of the user's resource transfer devices to be transferred to other resource transfer devices when the user or consumer decides to end their commitment to the specific entity. Such data regarding the user and consumer's use of the resource transfer device may be lost forever, such rewards and benefits may be lost forever, and the user or consumer may have to start from scratch with a new entity and new resource transfer device. Further still, users and consumers that build up their benefits on one resource transfer device may have a difficult time dynamically changing their resource availability when adding new resources to their portfolio. Instead, the user and consumer may have to go through long and arduous application processes to update their resource availability. A need, therefore, exists for a resource transfer device that allows dynamic and real-time updating of a resource transfer availability, a need for tracking and keeping data regarding the specific user and their resources as the user's resources change (real world and virtual), and an authentication of the resource transfer device in completing resource transfers within a virtual environment in a secure and efficient manner.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

In one aspect, a system for implementing and authenticating a virtual resource transfer device, the system comprising: a memory device with computer-readable program code stored thereon; at least one processing device operatively coupled to the at least one memory device and the at least one communication device, wherein executing the computer-readable code is configured to cause the at least one processing device to: receive data associated with a virtual resource token owned by a user; determine a resource value of the virtual resource token, wherein the resource value is determined based on at least one of a resource transfer associated with the virtual resource token, a real-time resource value of the virtual resource token, a resource value provided by an entity associated with the virtual resource transfer device, or a resource value provided by an entity associated with the virtual resource token; generate a virtual resource transfer device associated with the virtual resource token; and generate, based on the resource value of the virtual resource token, a resource transfer availability of the virtual resource transfer device.

In some embodiments, the processing device is further configured to: determine a resolution of the virtual resource token; and dynamically update, based on a resolution of the virtual resource token, the resource transfer availability of the virtual resource transfer device.

In some embodiments, the processing device is further configured to: receive an indication of a plurality of virtual resource tokens owned by the user; determine an aggregate resource value of the plurality of virtual resource tokens; and dynamically update, based on the aggregate resource value of the plurality of virtual resource tokens, the resource transfer availability of the virtual resource transfer device.

In some embodiments, the processing device is further configured to: receive a real-time resource availability data associated with the user, the real-time resource availability data comprising a plurality of currently owned resources of the user; receive a plurality of available virtual resource tokens; generate, based on the plurality of available virtual resource tokens, a plurality of acceptable virtual resource tokens to present to the user based on the real-time resource availability data; receive an accepted virtual resource token indication from the user, the accepted virtual resource token indication comprising a selected virtual resource token from the plurality of acceptable virtual resource tokens; generate the virtual resource transfer device associated with the selected virtual resource token; and generate, based on a resource value of the of the selected virtual resource token, the resource transfer availability of the virtual resource transfer device.

In some embodiments, the processing device is further configured to: receive, from a device associated with the user, a request for a resource transfer associated with the virtual resource transfer device; receive the virtual resource token associated with the virtual resource transfer device of the request for the resource transfer; validate the virtual resource token associated with the virtual resource transfer device of the request for the resource transfer, wherein the validation of the virtual resource token comprises a comparison of the virtual resource token with the verified virtual resource token; and determine whether a resource transfer is allowed, wherein, in an instance where the virtual resource token does not match the verified virtual resource token, deny the resource transfer, or wherein, in an instance where the virtual resource token does match the verified virtual resource token, allow the resource transfer.

In some embodiments, the processing device is further configured to: receive, from a device associated with the user, a device identifier of the device associated with the virtual resource transfer device; and register the device identifier as a verified device identifier in association with at least one of the user or the virtual resource transfer device. In some embodiments, the processing device is further configured to: receive, from a device associated with a request for a resource transfer, the request for the resource transfer associated with the virtual resource transfer device; receive a request device identifier based on the device associated with the request for the resource transfer; compare the request device identifier and the verified device identifier; and determine whether a resource is allowed, wherein, in an instance where the request device identifier does not match the verified device identifier, deny the resource transfer, or wherein, in an instance where the request device identifier does match the verified device identifier, allow the resource transfer.

In some embodiments, the processing device is further configured to: receive, from a user device associated with the user, a request for the resource transfer; determine an available resource of the virtual resource transfer device; verify the request for the resource transfer does not exceed the available resource of the virtual resource transfer device; and allow, based on the verification the request for the resource transfer does not exceed the available resource of the virtual resource transfer device, the resource transfer.

In another aspect, a computer program product for implementing and authenticating a virtual resource transfer device is provided. The computer program product comprises at least one non-transitory computer-readable medium having computer-readable program code portions embodied therein, the computer-readable program code portions which when executed by a processing device are configured to cause the processor to: receive data associated with a virtual resource token owned by a user; determine a resource value of the virtual resource token, wherein the resource value is determined based on at least one of a resource transfer associated with the virtual resource token, a real-time resource value of the virtual resource token, a resource value provided by an entity associated with the virtual resource transfer device, or a resource value provided by an entity associated with the virtual resource token; generate a virtual resource transfer device associated with the virtual resource token; and generate, based on the resource value of the virtual resource token, a resource transfer availability of the virtual resource transfer device.

In some embodiments, the processing device is further configured to: determine a resolution of the virtual resource token; and dynamically update, based on a resolution of the virtual resource token, the resource transfer availability of the virtual resource transfer device.

In some embodiments, the processing device is further configured to: receive an indication of a plurality of virtual resource tokens owned by the user; determine an aggregate resource value of the plurality of virtual resource tokens; and dynamically update, based on the aggregate resource value of the plurality of virtual resource tokens, the resource transfer availability of the virtual resource transfer device.

In some embodiments, the processing device is further configured to: receive a real-time resource availability data associated with the user, the real-time resource availability data comprising a plurality of currently owned resources of the user; receive a plurality of available virtual resource tokens; generate, based on the plurality of available virtual resource tokens, a plurality of acceptable virtual resource tokens to present to the user based on the real-time resource availability data; receive an accepted virtual resource token indication from the user, the accepted virtual resource token indication comprising a selected virtual resource token from the plurality of acceptable virtual resource tokens; generate the virtual resource transfer device associated with the selected virtual resource token; and generate, based on a resource value of the of the selected virtual resource token, the resource transfer availability of the virtual resource transfer device.

In some embodiments, the processing device is further configured to: receive, from a device associated with the user, data associated with the virtual resource token of the virtual resource transfer device; and register the virtual resource token of the virtual resource transfer device as a verified virtual resource token of the virtual resource transfer device, wherein the register comprises a record of the virtual resource token, the virtual resource transfer device, and a user account associated with the user.

In some embodiments, the processing device is further configured to: receive, from a user device associated with the user, a request for the resource transfer; determine an available resource of the virtual resource transfer device; verify the request for the resource transfer does not exceed the available resource of the virtual resource transfer device; and allow, based on the verification the request for the resource transfer does not exceed the available resource of the virtual resource transfer device, the resource transfer.

In another aspect, a computer-implemented method for implementing and authenticating a virtual resource transfer device is provided. The computer-implemented method may comprise: receiving data associated with a virtual resource token owned by a user; determining a resource value of the virtual resource token, wherein the resource value is determined based on at least one of a resource transfer associated with the virtual resource token, a real-time resource value of the virtual resource token, a resource value provided by an entity associated with the virtual resource transfer device, or a resource value provided by an entity associated with the virtual resource token; generating a virtual resource transfer device associated with the virtual resource token; and generating, based on the resource value of the virtual resource token, a resource transfer availability of the virtual resource transfer device.

In some embodiments, the computer-implemented method may further comprise: determining a resolution of the virtual resource token; and dynamically updating, based on a resolution of the virtual resource token, the resource transfer availability of the virtual resource transfer device.

In some embodiments, the computer-implemented method may further comprise: receiving an indication of a plurality of virtual resource tokens owned by the user; determining an aggregate resource value of the plurality of virtual resource tokens; and dynamically updating, based on the aggregate resource value of the plurality of virtual resource tokens, the resource transfer availability of the virtual resource transfer device.

In some embodiments, the computer-implemented method may further comprise: receiving a real-time resource availability data associated with the user, the real-time resource availability data comprising a plurality of currently owned resources of the user; receiving a plurality of available virtual resource tokens; generating, based on the plurality of available virtual resource tokens, a plurality of acceptable virtual resource tokens to present to the user based on the real-time resource availability data; receiving an accepted virtual resource token indication from the user, the accepted virtual resource token indication comprising a selected virtual resource token from the plurality of acceptable virtual resource tokens; generating the virtual resource transfer device associated with the selected virtual resource token; and generating, based on a resource value of the of the selected virtual resource token, the resource transfer availability of the virtual resource transfer device.

In some embodiments, the computer-implemented method may further comprise: receiving, from a device associated with the user, data associated with the virtual resource token of the virtual resource transfer device; and registering the virtual resource token of the virtual resource transfer device as a verified virtual resource token of the virtual resource transfer device, wherein the registration comprises a record of the virtual resource token, the virtual resource transfer device, and a user account associated with the user.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1A:
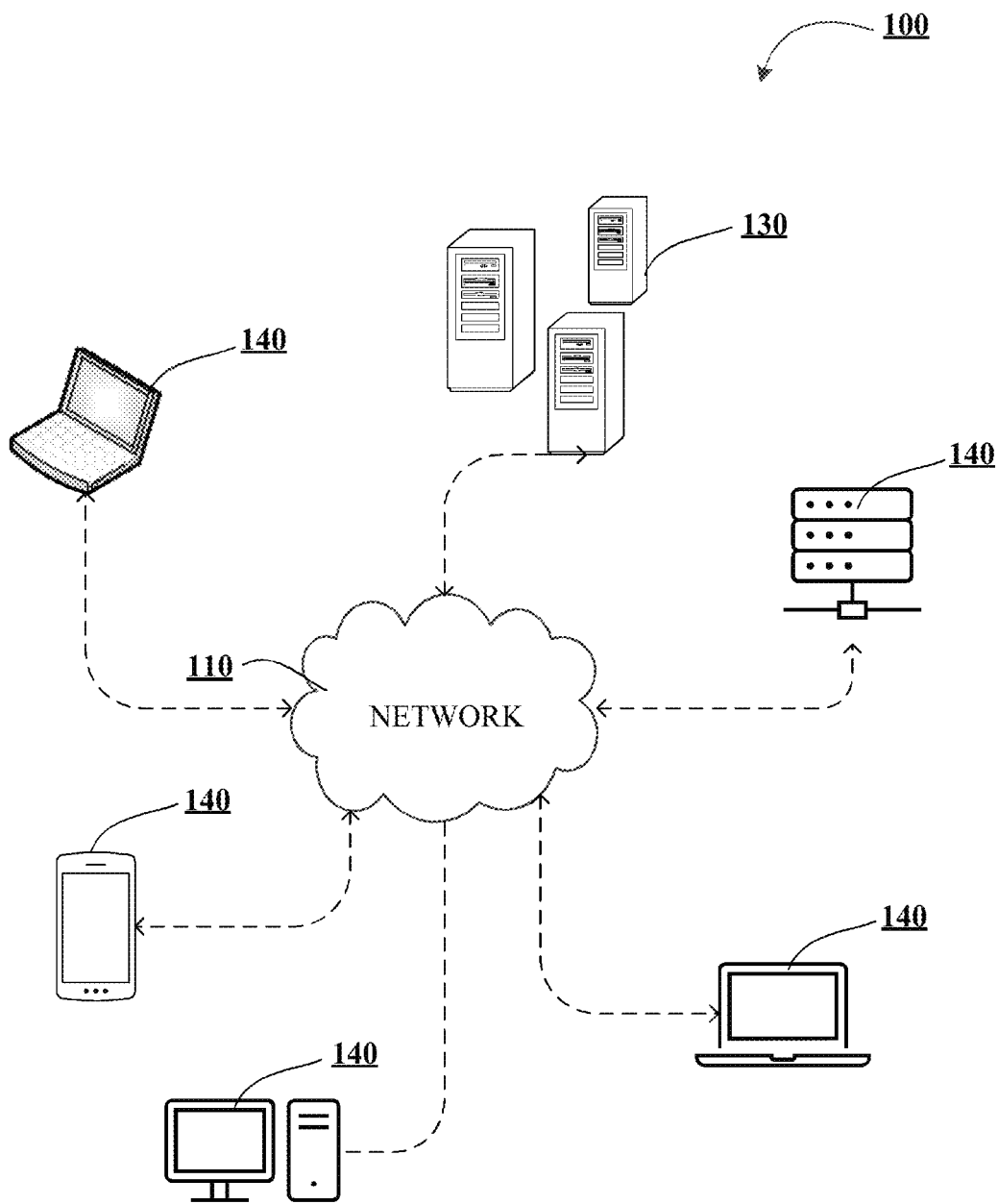
Figure 1B:
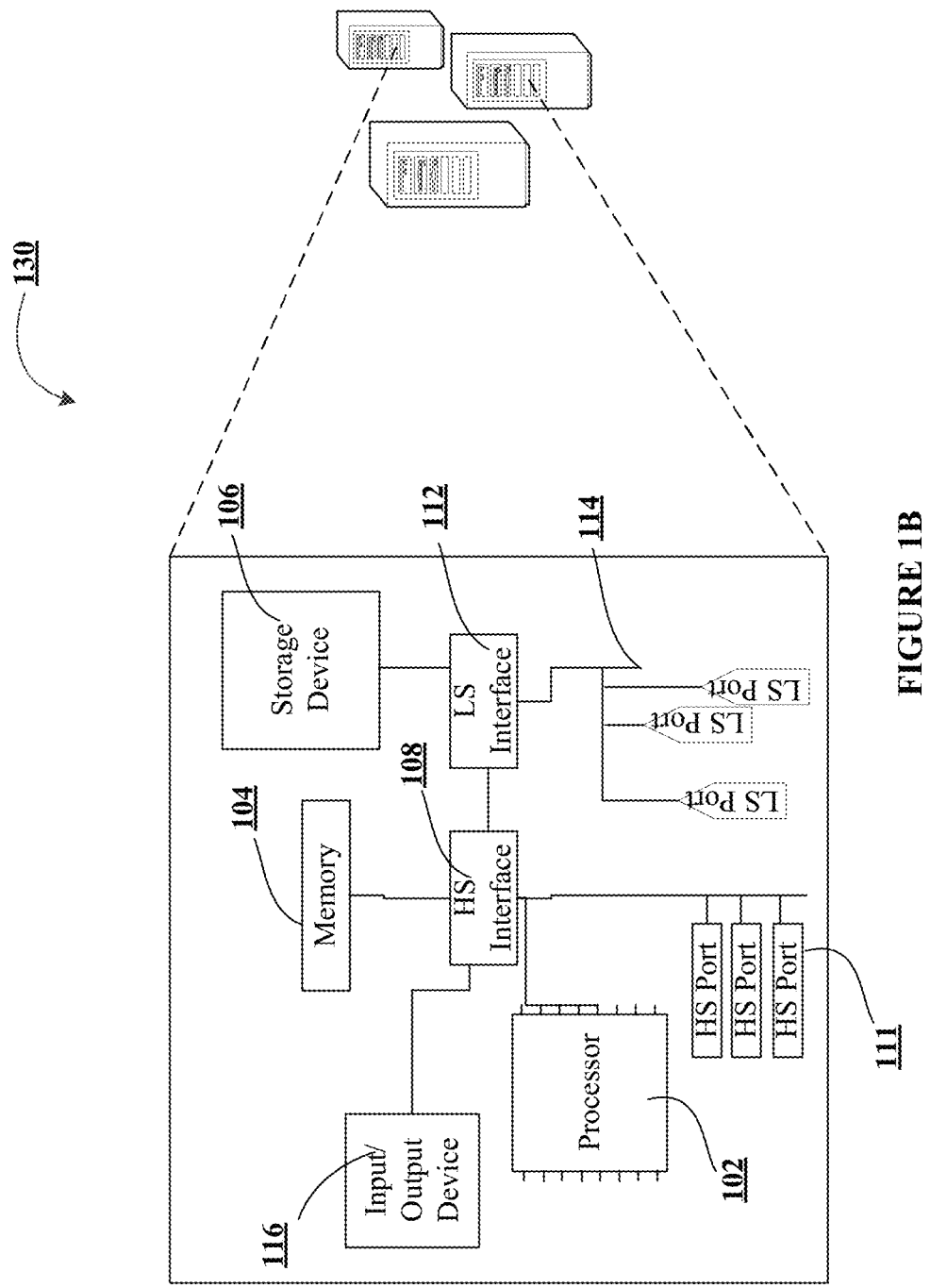
Figure 1C:
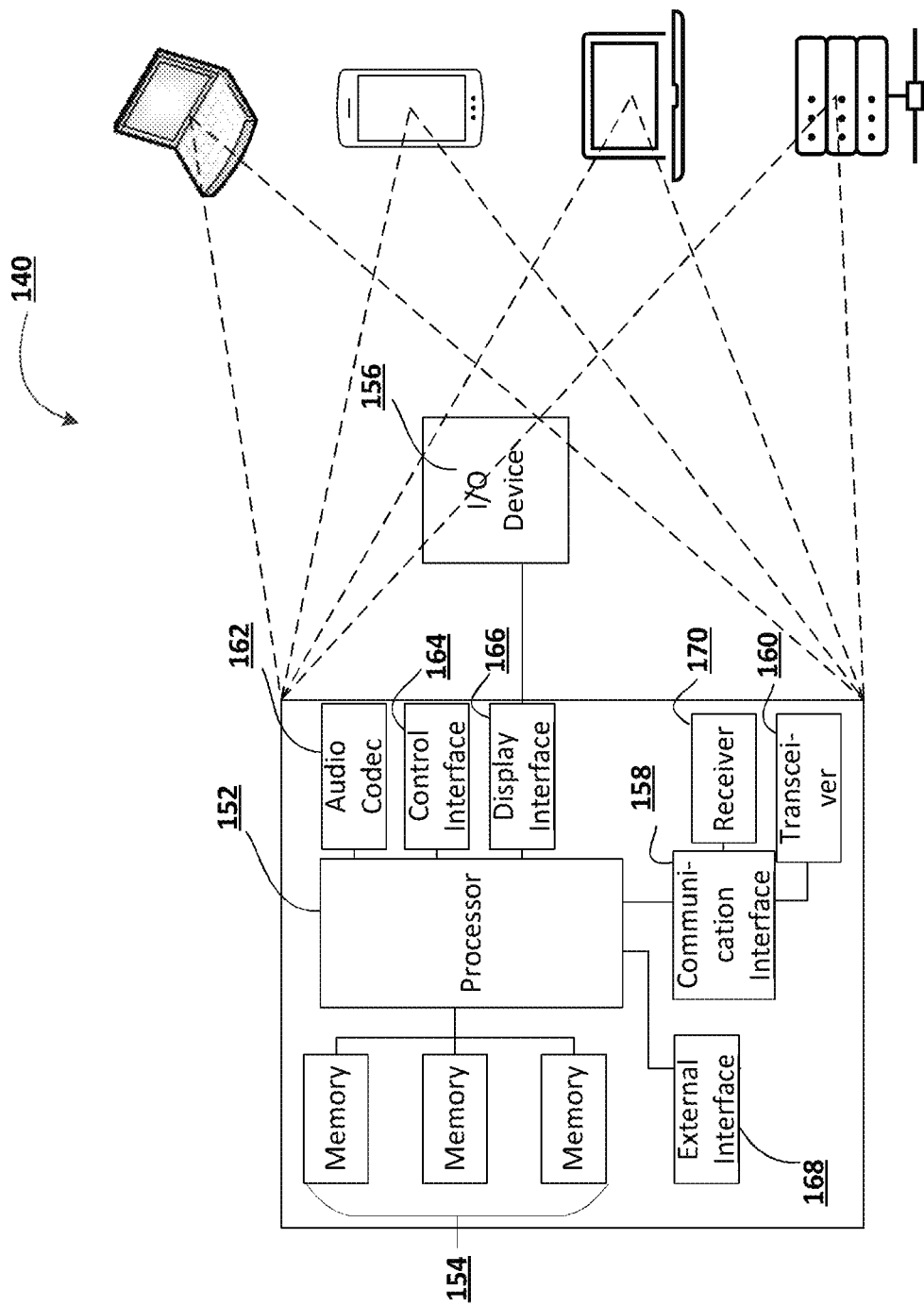
Figure 2:
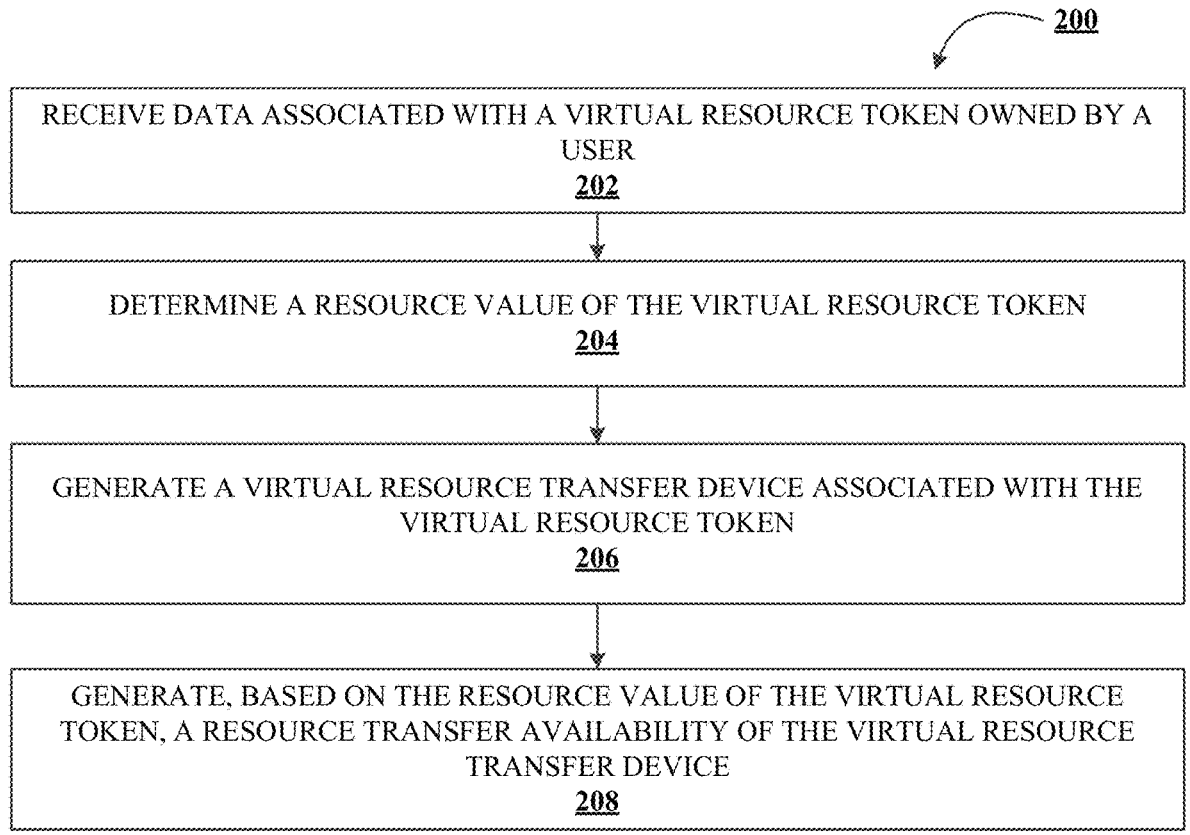
Figure 3:
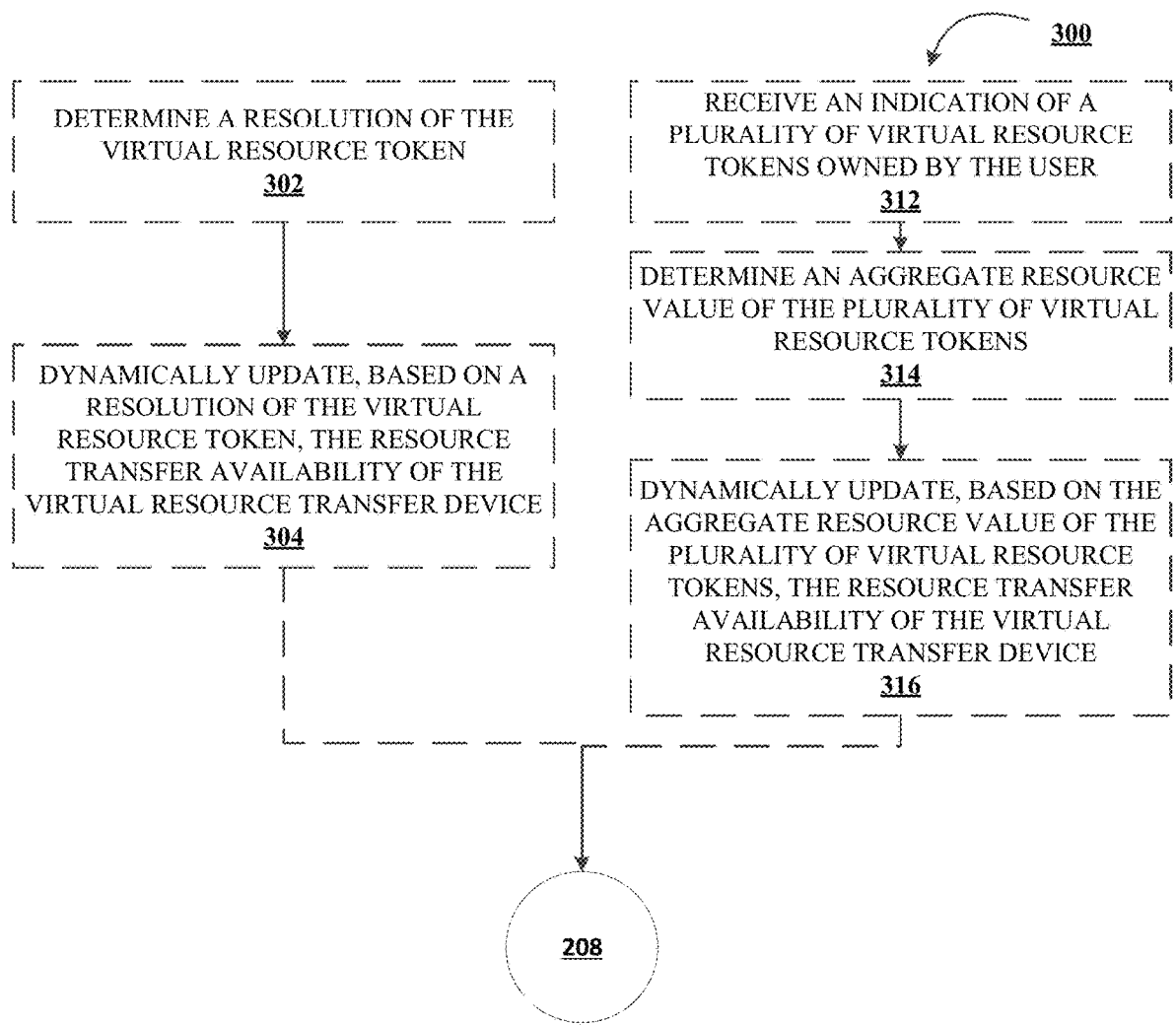
Figure 4:
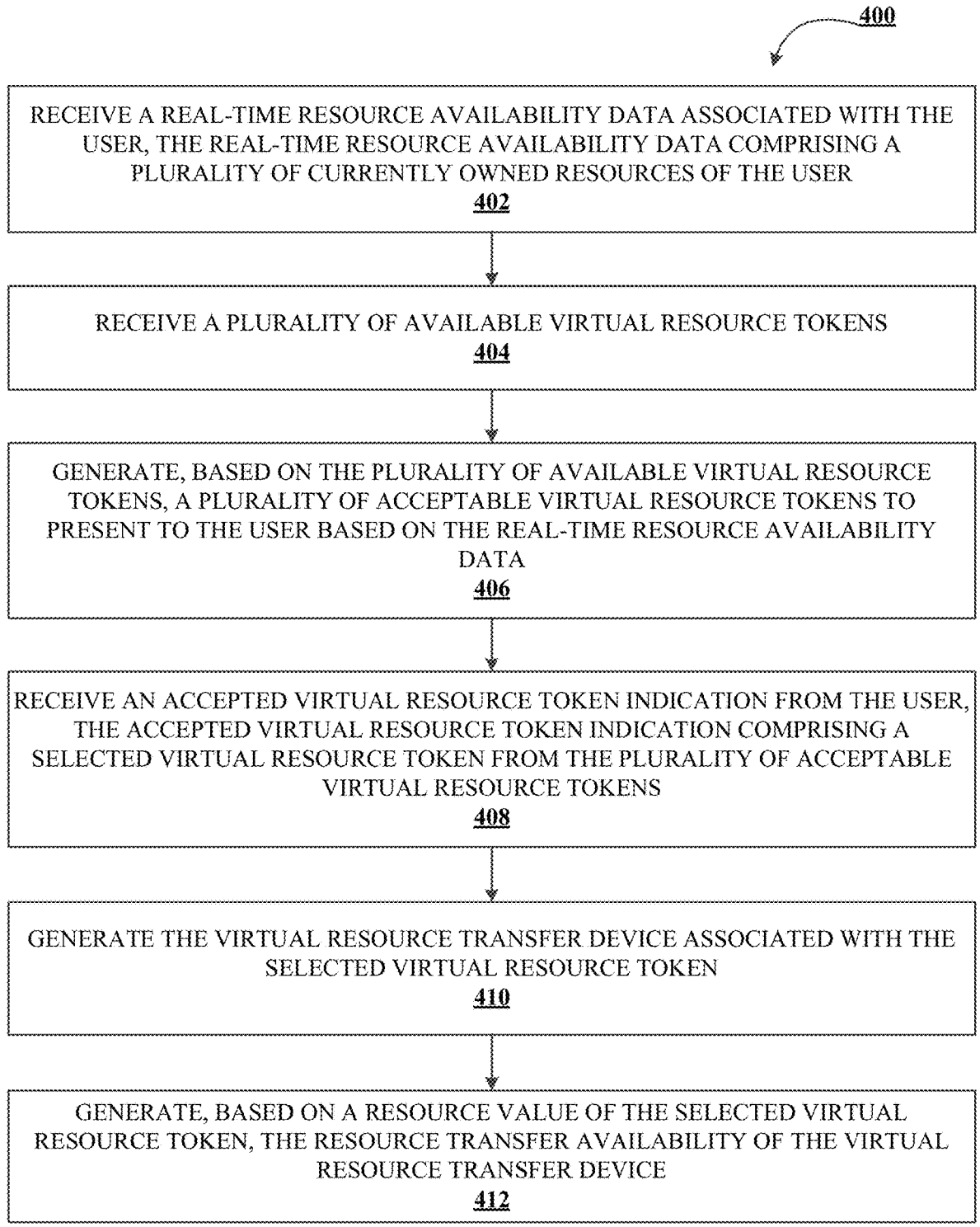
Figure 5:
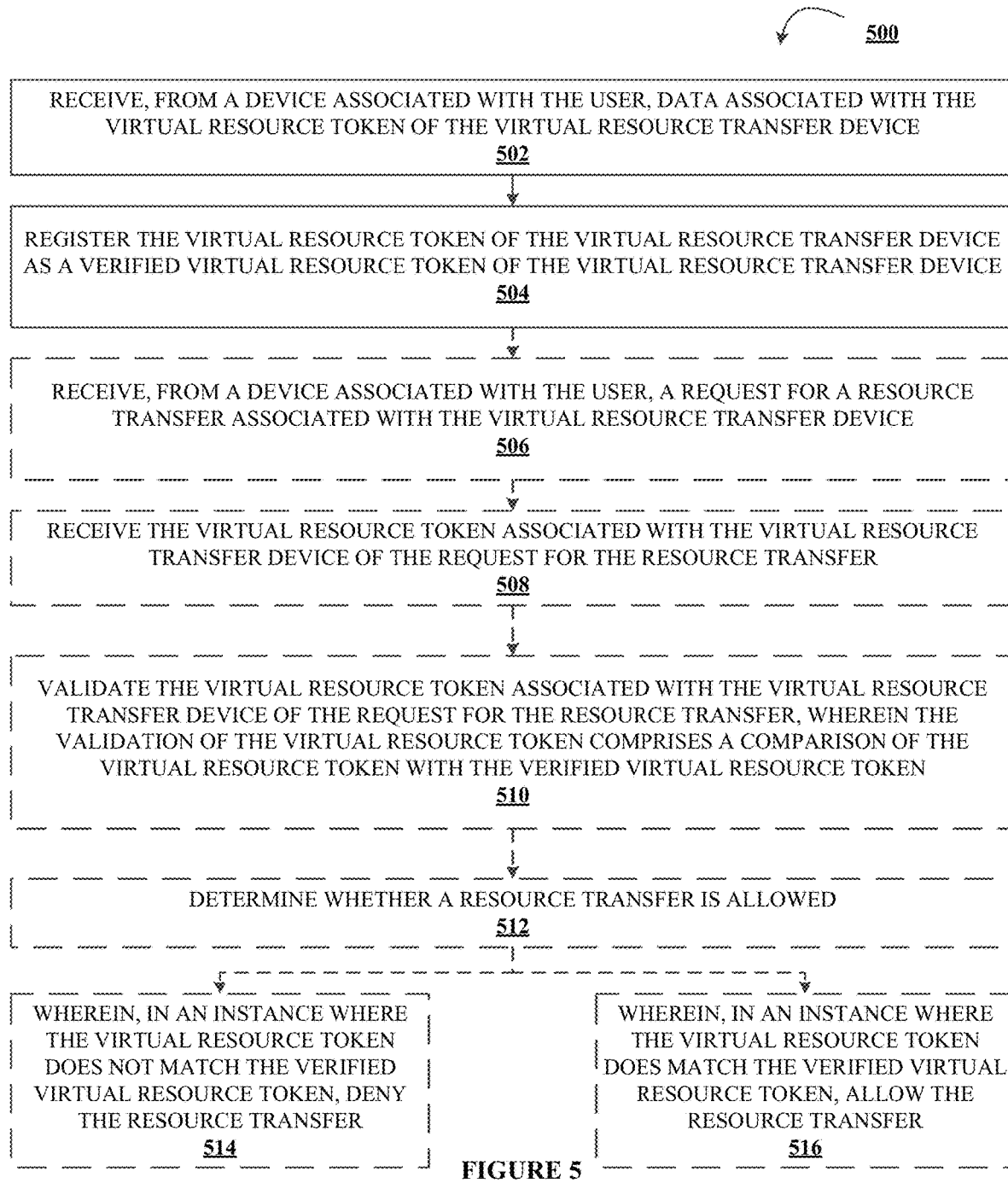
Figure 6:
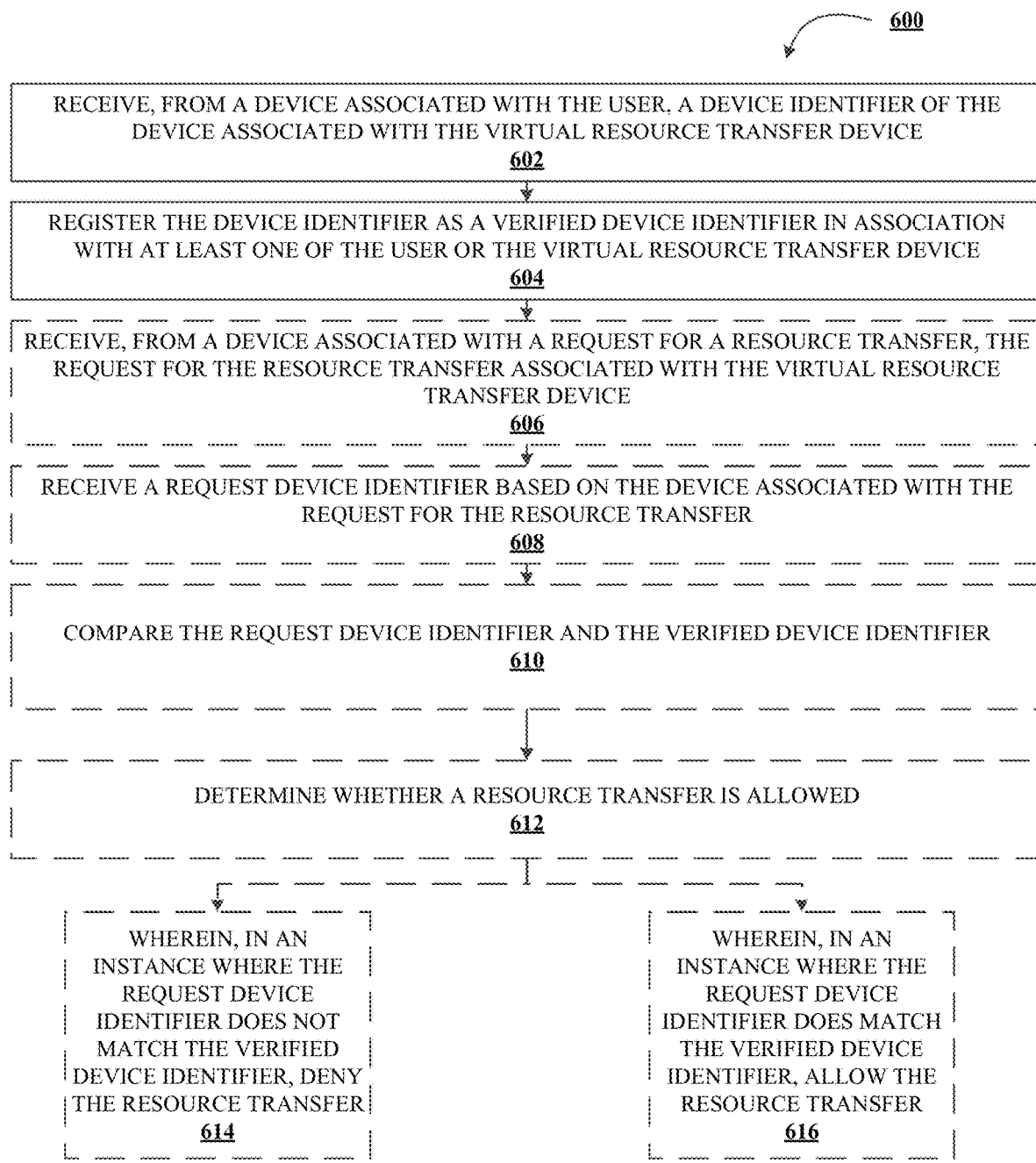
Figure 7:
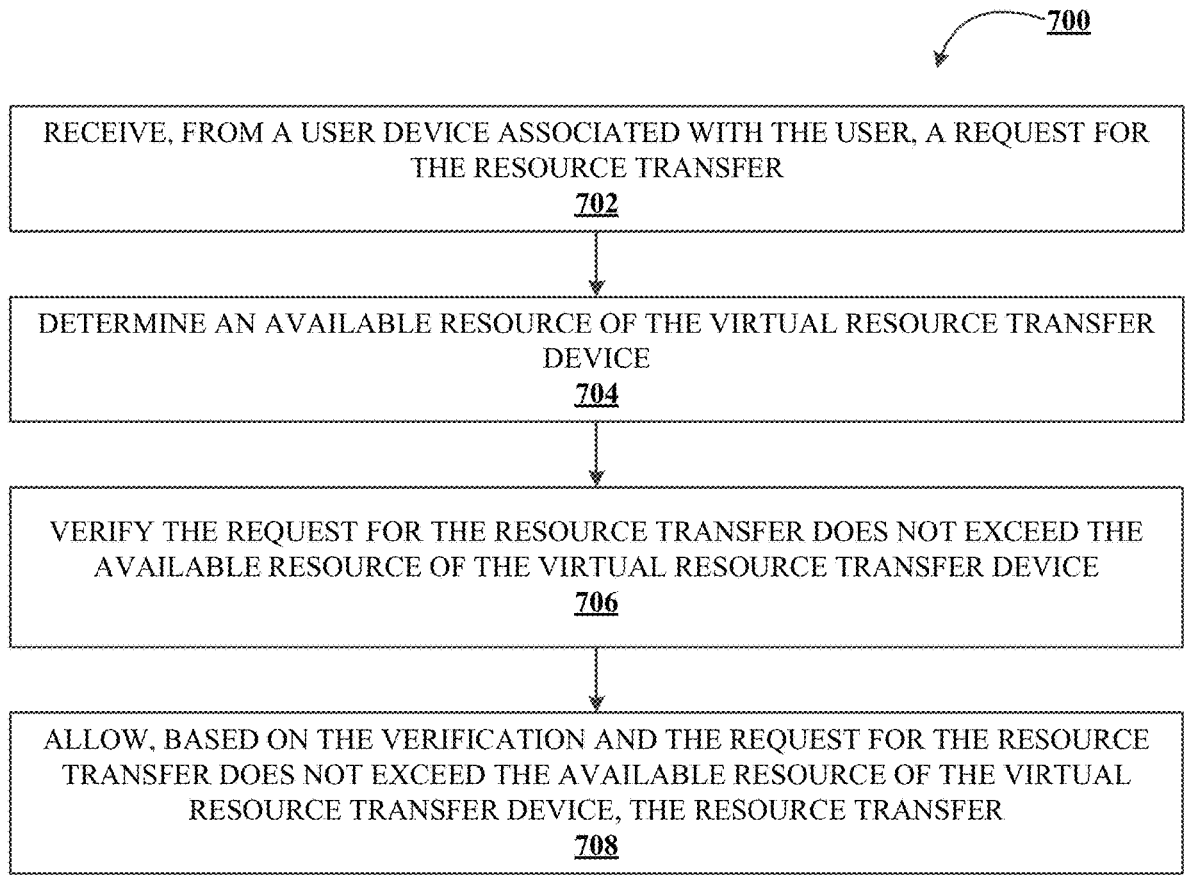

Having thus described embodiments of the invention in general terms, reference will now be made the accompanying drawings, wherein:

FIGS. 1A-1C illustrates technical components of an exemplary distributed computing environment for implementing and authenticating virtual resource transfer devices comprising electronic data records in a distributed network, in accordance with an embodiment of the invention;

FIG. 2 illustrates a process flow for implementing and authenticating virtual resource transfer devices comprising electronic data records in a distributed network, in accordance with an embodiment of the invention;

FIG. 3 illustrates a process flow for dynamically updating the resource transfer availability of the virtual resource transfer device, in accordance with an embodiment of the invention;

FIG. 4 illustrates a process flow for generating a resource transfer availability of the virtual resource transfer device, in accordance with an embodiment of the invention;

FIG. 5 illustrates a process flow for determining whether a resource transfer should be allowed based on a verified virtual resource token, in accordance with an embodiment of the invention;

FIG. 6 illustrates a process flow for determining whether a resource transfer should be allowed based on a verified device identifier, in accordance with an embodiment of the invention; and FIG. 7 illustrates a process flow for allowing a resource transfer based on a determination that the request for the resource transfer does not exceed the available resource of the virtual resource transfer device, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of an application, or part of an application that serves as a foundation for a larger piece of software and drives the functionality of the software. In some embodiments, an engine may be self-contained, but externally-controllable code that encapsulates powerful logic designed to perform or execute a specific type of function. In one aspect, an engine may be underlying source code that establishes file hierarchy, input and output methods, and how a specific part of an application interacts or communicates with other software and/or hardware. The specific components of an engine may vary based on the needs of the specific application as part of the larger piece of software. In some embodiments, an engine may be configured to retrieve resources created in other applications, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

As used herein, a "resource" may generally refer to objects, products, devices, goods, commodities, services, and the like, and/or the ability and opportunity to access and use the same. Some example implementations herein contemplate property held by a user, including property that is stored and/or maintained by a third-party entity. In some example implementations, a resource may be associated with one or more accounts or may be property that is not associated with a specific account. Examples of resources associated with accounts may be accounts that have cash or cash equivalents, commodities, and/or accounts that are funded with or contain property, such as safety deposit boxes containing jewelry, art or other valuables, a trust account that is funded with property, or the like. For purposes of this invention, a resource is typically stored in a resource repository—a storage location where one or more resources are organized, stored and retrieved electronically using a computing device.

As used herein, a "resource transfer," "resource distribution," or "resource allocation" may refer to any transaction, activities or communication between one or more entities, or between the user and the one or more entities. A resource transfer may refer to any distribution of resources such as, but not limited to, a payment, processing of funds, purchase of goods or services, a return of goods or services, a payment transaction, a credit transaction, or other interactions involving a user's resource or account. Unless specifically limited by the context, a "resource transfer" a "transaction", "transaction event" or "point of transaction event" may refer to any activity between a user, a merchant, an entity, or any combination thereof. In some embodiments, a resource transfer or transaction may refer to financial transactions involving direct or indirect movement of funds through traditional paper transaction processing systems (i.e. paper check processing) or through electronic transaction processing systems. Typical financial transactions include point of sale (POS) transactions, automated teller machine (ATM) transactions, person-to-person (P2P) transfers, internet transactions, online shopping, electronic funds transfers between accounts, transactions with a financial institution teller, personal checks, conducting purchases using loyalty/rewards points etc. When discussing that resource transfers or transactions are evaluated it could mean that the transaction has already occurred, is in the process of occurring or being processed, or it has yet to be processed/posted by one or more financial institutions. In some embodiments, a resource transfer or transaction may refer to non-financial activities of the user. In this regard, the transaction may be a customer account event, such as but not limited to the customer changing a password, ordering new checks, adding new accounts, opening new accounts, adding or modifying account parameters/restrictions, modifying a payee list associated with one or more accounts, setting up automatic payments, performing/modifying authentication procedures and/or credentials, and the like.

As used herein, "payment instrument" may refer to an electronic payment vehicle, such as an electronic credit or debit card. The payment instrument may not be a "card" at all and may instead be account identifying information stored electronically in a user device, such as payment credentials or tokens/aliases associated with a digital wallet, or account identifiers stored by a mobile application.

As described in further detail herein, the present invention provides a solution to the above-referenced problems in the field of technology by generating a secure, accurate, and efficient process for implementing and authenticating virtual resource transfer devices comprising electronic data records in a distributed network. The present invention solves this technical problem by implementing a virtual resource transfer device system, like that shown as system 130 in FIGS. 1A-1C. For instance, the virtual resource transfer device system acts to implement a virtual resource transfer device associated with a user based on the user's ownership of a plurality of virtual resource tokens, where the virtual resource transfer device system may dynamically update the resource transfer availability of the virtual resource transfer device—in real-time—as the attributes of the virtual resource token are changed and/or as the virtual resource tokens are added or deleted from the user's virtual resource token portfolio. Further, the virtual resource transfer device system acts to verify and authenticate the resource transfers requested by the user by determining verified virtual resource tokens, determining verified device identifiers, and/or the like, and comparing such data to current data comprised with the request for the resource transfer. Thus, the virtual resource transfer device system provides a technical solution to the technical problem in securely, accurately, and efficiently implementing, updating, and authenticating virtual resource transfer devices for resource transfers in a virtual environment.

Accordingly, the virtual resource transfer device system works by receiving data associated with a virtual resource token owned by a user; determining a resource value of the virtual resource token, wherein the resource value is determined based on at least one of a resource transfer associated with the virtual resource token, a real-time resource value of the virtual resource token, a resource value provided by an entity associated with the virtual resource transfer device, or a resource value provided by an entity associated with the virtual resource token; generating a virtual resource transfer device associated with the virtual resource token; and generating, based on the resource value of the virtual resource token, a resource transfer availability of the virtual resource transfer device.

What is more, the present invention provides a technical solution to a technical problem. As described herein, the technical problem includes the implementation and authentication of a virtual resource device in a distributed network where the resources used in a virtual environment may lead to time-consuming, unsecure, and inauthentic resource transfers as users may be more likely to submit requests for resource transfers in the virtual environment under misappropriated user accounts, where the user may no longer have resources previously owned (e.g., virtual resource tokens, real-world resources, virtual resources, and/or the like) and relied upon in generating a resource transfer availability, and/or the like. The technical solution presented herein allows for the implementation, updating, and authentication of a virtual resource transfer device as it is used for resource transfers. In particular, virtual resource transfer device system is an improvement over existing solutions to the implementation and authentication problems identified herein (i) with fewer steps to achieve the solution, thus reducing the amount of computing resources, such as processing resources, storage resources, network resources, and/or the like, that are being used, (ii) providing a more accurate solution to problem, thus reducing the number of resources required to remedy any errors made due to a less accurate solution, (iii) removing manual input and waste from the implementation of the solution, thus improving speed and efficiency of the process and conserving computing resources, (iv) determining an optimal amount of resources that need to be used to implement the solution, thus reducing network traffic and load on existing computing resources. Furthermore, the technical solution described herein uses a rigorous, computerized process to perform specific tasks and/or activities that were not previously performed. In specific implementations, the technical solution bypasses a series of steps previously implemented, thus further conserving computing resources.

FIGS. 1A-1C illustrate technical components of an exemplary distributed computing environment for implementing and authenticating virtual resource transfer devices comprising electronic data records in a distributed network 100, in accordance with an embodiment of the invention. As shown in FIG. 1A, the distributed computing environment 100 contemplated herein may include a system 130 (i.e., virtual resource transfer device system), an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the inventions described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the invention. As shown in FIG. 1B, the system 130 may include a processor 102, memory 104, input/output (I/O) device 116, and a storage device 106. The system 130 may also include a high-speed interface 108 connecting to the memory 104, and a low-speed interface 112 (shown as "LS Interface") connecting to low speed bus 114 (shown as "LS Port") and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 (shown as "HS Interface") is coupled to memory 104, input/output (I/O) device 116 (e.g., through a graphics processor or accelerator), and to high-speed expansion ports 111 (shown as "HS Port"), which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the invention. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer—or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation—and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert it to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

FIG. 2 illustrates a process flow 200 for implementing and authenticating virtual resource transfer devices comprising electronic data records in a distributed network, in accordance with an embodiment of the invention. In some embodiments, a system (e.g., similar to one or more of the systems described herein with respect to FIGS. 1A-1C) may perform one or more of the steps of process flow 200. For example, a virtual resource transfer device system (e.g., the system 130 described herein with respect to FIGS. 1A-1C) may perform the steps of process flow 200.

As shown in block 202, the process flow 200 may include the step of receiving data associated with a virtual resource token owned by a user. As used herein, the virtual resource token may refer to a cryptographic resource within a distributed ledger comprising unique attributes and a unique identification code. In some embodiments, the virtual resource token may be a non-fungible token that is indicated by a digital resource such as a piece of artwork, a photograph, a video, a song, and/or the like, where ownership is verifiable. In some embodiments, the data associated with the virtual resource token may comprise data regarding the virtual resource token's appearance (e.g., data regarding the appearance of the image where the virtual resource token is a photograph, artwork, video, and/or the like), the virtual resource token's resolution, the virtual resource token's origination data (e.g., data regarding the creator of the virtual resource token, data regarding the date of origination, and/or the like), the current owner of the virtual resource token, an entity associated with the virtual resource token and the current owner of the virtual resource token (such as an entity controlling a resource account(s) associated with the user), and/or the like.

As shown in block 204, the process flow 200 may include the step of determining a resource value of the virtual resource token. In some embodiments, the resource value may be generated and/or determined based on a plurality of factors or data. For instance, such factors or data may include at least one of a resource transfer associated with the virtual resource token, a real-time resource value of the virtual resource token, a resource value provided by an entity associated with the virtual resource transfer device, or a resource value provided by an entity associated with the virtual resource token.

By way of non-limiting example, such a resource transfer associated with the virtual resource token may comprise data regarding the resource transfer used to purchase the virtual resource token, the time of the resource transfer, the accounts involved in the resource transfer of the virtual resource token (e.g., the most-recent seller account and the current owner account of the virtual resource token), and/or the like. By way of non-limiting example, such a real-time resource value of the virtual resource token may comprise data regarding the current valuation of the virtual resource token. By way of non-limiting example, such a resource value provided by an entity associated with the virtual resource transfer device may comprise data regarding the current valuation of the virtual resource token generated by an entity such as an institution which manages a plurality of resource accounts of the user account associated with the virtual resource token (e.g., such as a financial institution). By way of non-limiting example, such a resource value provided by an entity associated with the virtual resource token may comprise a resource value generated by an entity such as a central authority of the virtual resource token, a central authority of the distributed ledger associated with the virtual resource token, and/or the entity that created the virtual resource token.

In some embodiments, the resource value of the virtual resource token may be determined by an aggregate of a plurality of data (e.g., resource transfer associated with the virtual resource token, a real-time resource value of the virtual resource token, a resource value provided by an entity associated with the virtual resource transfer device, and/or a resource value provided by an entity associated with the virtual resource token) or may be determined based on a single piece of data. In some embodiments, the manager of the virtual resource transfer device system may determine which, from the plurality of data types, of the data should be used to determine the resource value of the virtual resource token.

In some embodiments, the resource value of the virtual resource token may be increased or lowered based on the data provided (e.g., resource transfer associated with the virtual resource token, a real-time resource value of the virtual resource token, a resource value provided by an entity associated with the virtual resource transfer device, and/or a resource value provided by an entity associated with the virtual resource token). In some embodiments, the resource value of the virtual resource token may be increased or decreased based on a resolution of the virtual resource token. Some such embodiments are described in further detail below with respect to FIG. 3. In some embodiments, the resource value (and the resolution) of the virtual resource token may be increased or decreased based upon real-world data of the user, such as but not limited to a resource score, current real-world resources owned by the user, and/or the like.

As shown in block 206, the process flow 200 may include the step of generating a virtual resource transfer device associated with the virtual resource token. As used herein, a virtual resource transfer device may refer to a device, an account identifier (such as a unique identifier comprising numbers and characters), and/or the like, which may be used to complete resource transactions or resource transfers in a virtual environment. In some embodiments, the virtual resource transfer device may be used to identify a resource account associated with the user of the virtual resource transfer device, where the resource account may comprise resources from which the virtual resource transfer device may be used to pull from in completing a resource transfer.

In some embodiments, and in order to generate the virtual resource transfer device, a virtual resource token must be linked to the virtual resource transfer device such that the resource value of the virtual resource token is used to determine an availability of the resources for the virtual resource transfer device. For instance, and by way of non-limiting example, the resource value (e.g., current valuation of the virtual resource token) may be used by an entity associated with the user account for the virtual resource transfer device to determine an availability of resources to allow the virtual resource transfer device to have. In some embodiments, and as the virtual resource token's value increases, decreases, and/or new virtual resource tokens are added or used to replace the previous virtual resource token, a new resource value may be determined such that a new resource transfer availability for the virtual resource transfer device is also determined/generated.

As shown in block 208, the process flow 200 may include the step of generating, based on the resource value of the virtual resource token, a resource transfer availability of the virtual resource transfer device. By way of non-limiting example, the virtual resource transfer device system may generate, based on the resource value of the virtual resource token, the resource transfer availability which may be comprise an amount of resources available for transferring from an account associated with the virtual resource transfer device within the virtual environment. In some embodiments, and where a request for a resource transfer comprises a resource amount that exceeds the resource transfer availability of the virtual resource transfer device, a denial of the resource transfer may be output by the virtual resource transfer device system. In some embodiments, and where the request for the resource transfer comprises a resource transfer that does not exceed the resource transfer availability of the virtual resource transfer device, an allowance of the resource transfer may be output. Such embodiments are described in further detail below with respect to FIG. 7.

In some embodiments, and where the virtual resource transfer device is used in a plurality of resource transfers, the resource transfer availability may be decreased by an amount of the previous resource transfers.

FIG. 3 illustrates a process flow 300 for dynamically updating the resource transfer availability of the virtual resource transfer device, in accordance with an embodiment of the invention. In some embodiments, a system (e.g., similar to one or more of the systems described herein with respect to FIGS. 1A-IC) may perform one or more of the steps of process flow 300. For example, a virtual resource transfer device system (e.g., the system 130 described herein with respect to FIGS. 1A-1C) may perform the steps of process flow 300.

In some embodiments, and as shown in block 302, the process 300 may include the step of determining a resolution of the virtual resource token. By way of non-limiting example, the virtual resource transfer device system may determine a resolution of the virtual resource token based on an amount of pixels per the virtual resource token, where the virtual resource token comprises an image. By way of non-limiting example, the more pixels within the virtual resource token, the higher the resolution, and the higher a resource value (where the resource value is based at least in part—or fully—on the resolution of the virtual resource token). In some embodiments, the virtual resource token's resolution may change during its lifetime of a user's ownership. For instance, and where the virtual resource token goes through a resource devaluation, the resolution of the virtual resource token may also decrease. Similarly, and where the virtual resource token increases in resource value, the resolution of the virtual resource token may increase.

In some embodiments, and as shown in block 304, the process 300 may include the step of dynamically updating, based on a resolution of the virtual resource token, the resource transfer availability of the virtual resource transfer device. In some embodiments, the virtual resource transfer device system may dynamically and automatically update the resource transfer availability of the virtual resource transfer device associated with the virtual resource token based on the current valuation of the virtual resource token. For instance, and where the resolution of the virtual resource token changes, the virtual resource transfer device system may likewise increase or decrease the resource transfer availability. In some embodiments, and following the step shown in block 304, the virtual resource transfer device associated with the virtual resource token may be generated based on the current resource value of the virtual resource token (like that shown in block 208 of FIG. 2).

In some embodiments, and as shown in block 312, the process 300 may include the step of receiving an indication of a plurality of virtual resource tokens owned by the user. By way of non-limiting example, the virtual resource transfer device system may receive an indication, from a user device associated with the user and/or from an entity associated with a user account (such as an entity associated with the virtual resource tokens owned by the user, like a financial institution, a virtual financial institution, a distributed ledger manager, and/or the like), showing a plurality of virtual resource tokens currently owned by the user. In some embodiments, the indication of the plurality of virtual resource tokens may comprise data of each of the virtual resource tokens, individually. For instance, and similar to that described above with respect to block 202, such data may comprise, but not be limited to, data regarding the resource amount used in the purchase of the virtual resource token, data regarding the creator of the virtual resource token, data regarding the current owner and previous owners of the virtual resource token, and/or the like.

In some embodiments, and as shown in block 314, the process 300 may include the step of determining an aggregate resource value of the plurality of virtual resource tokens. In some embodiments—and based on the data received within the indication of the plurality of virtual resource tokens owned by the user—the virtual resource transfer device system may determine an aggregate resource value of the plurality of virtual resource tokens. In some embodiments, such an aggregate resource value may be based on an aggregation of each of the resource values determined for each of the virtual resource tokens, individually. In some embodiments, the aggregate resource value of the plurality of resource tokens may be based on an aggregation of only certain virtual resource tokens owned by the user, which may be determined by at least one of the user that owns the virtual resource token(s), an entity associated with the virtual resource transfer device, an entity associated with the virtual resource token(s), and/or the like. By way of non-limiting example, each resource value of each of the virtual resource tokens owned by a user may be determined in the same or similar manner as that described above with respect to block 202.

In some embodiments, and as shown in block 316, the process 300 may include the step of dynamically updating, based on the aggregate resource value of the plurality of virtual resource tokens, the resource transfer availability of the virtual resource transfer device. In some embodiments, the virtual resource transfer device system may dynamically update the resource transfer availability of the virtual resource transfer device associated with the user based on the current resource value (or the aggregate resource value where there are a plurality of virtual resource tokens) of the virtual resource token(s). By way of non-limiting example, the dynamic updating of the resource transfer availability may be changed automatically as new virtual resource tokens are added to the user's account (e.g., purchased by the user), as virtual resource tokens are taken out of the user's account (e.g., the current user sells the virtual resource token within the virtual environment), as the resolution of the virtual resource tokens change, as the valuation of the virtual resource tokens change, and/or the like. Such changes may lead to the change in the aggregate resource value of the plurality of virtual resource tokens, which in turn may automatically change/update the resource transfer availability of the virtual resource token device associated with the plurality of virtual resource tokens.

In some embodiments, and following the step shown in block 316, the virtual resource transfer device associated with the virtual resource token may be generated based on the current resource value of the virtual resource token (like that shown in block 208 of FIG. 2).

FIG. 4 illustrates a process flow 400 for generating a resource transfer availability of the virtual resource transfer device, in accordance with an embodiment of the invention. In some embodiments, a system (e.g., similar to one or more of the systems described herein with respect to FIGS. 1A-1C) may perform one or more of the steps of process flow 400. For example, the virtual resource transfer device system (e.g., the system 130 described herein with respect to FIGS. 1A-1C) may perform the steps of process flow 400.

As shown in block 402, the process 400 may include the step of receiving a real-time resource availability data associated with the user, the real-time resource availability data comprising a plurality of currently owned resources of the user. In some embodiments, the virtual resource transfer device system may receive data regarding the currently owned resources of the user from a plurality of entity systems over a network (e.g., network 110 of FIG. 1). For instance, the data regarding the currently owned resources of the user may comprise resource accounts owned by the user, a resource score based on the user's ability to meet resource deadlines, currently owned real-world resources of the user (e.g., personal property, real property, and/or the like), currently owned virtual world resources of the user (e.g., virtual resource token, virtual property, and/or the like), and/or the like. In some embodiments, such data regarding the plurality of currently owned resources of the user may be stored in a database of the virtual resource transfer device system.

As shown in block 404, the process 400 may include the step of receiving a plurality of available virtual resource tokens. In some embodiments, the virtual resource transfer device system may receive a plurality of virtual resource tokens from at least one of an entity associated with the plurality of available virtual resource tokens (e.g., a centralized authority of the distributed ledger which stores the available virtual resource tokens, an entity associated with a virtual resource token marketplace, and/or the like), an entity associated with the user account (e.g., a financial institution associated with a plurality of available virtual resource tokens), and/or the like. In some embodiments, the virtual resource transfer device system may receive, over a network (such as network 110 of FIG. 1A), a plurality of indications and data regarding the plurality of available virtual resource tokens which are available for purchase by the user. In some embodiments, the virtual resource transfer device system may employ a web scraper to extract data regarding the plurality of available virtual resource tokens by scraping data from the internet. Upon web scraping data regarding the plurality of available virtual resource tokens, such data may be stored in a database of the virtual resource transfer device system (such as memory 104 and/or storage device 106 of FIG. 1B).

As shown in block 406, the process 400 may include the step of generating, based on the plurality of available virtual resource tokens, a plurality of acceptable virtual resource tokens to present to the user based on the real-time resource availability data. In some embodiments, and upon receiving the plurality of available virtual resource tokens, the virtual resource transfer device system may compare the available virtual resource tokens against the real-time resource availability data to determine a plurality of acceptable virtual resource tokens that the user may purchase. By way of non-limiting example, the virtual resource transfer device system may only present to the user the plurality of acceptable virtual resource tokens that the user may be able to purchase based on the user's real-time resource availability data. In this manner, the virtual resource transfer device system may filter a plurality of acceptable virtual resource tokens from the plurality of available virtual resource tokens, such that only a portion of the available virtual resource tokens are presented to the user.

In some embodiments, the virtual resource transfer device system may aggregate the acceptable virtual resource tokens to generate an acceptable virtual resource token interface component for transmission over a network (such as network 110) to a user device associated with the user. By way of non-limiting example, and upon the transmission of the acceptable virtual resource token interface component, the acceptable virtual resource token interface component may configure the graphical user interface (GUI) of the user device to show the user the plurality of acceptable virtual resource tokens. From there, the user may choose one or more of the acceptable virtual resource tokens. In some embodiments, the acceptable virtual resource tokens may be organized within the acceptable virtual resource token interface component to show the plurality of virtual resource tokens in a specified order, such as but not limited to an order based on a resource value in descending order (e.g., placing the acceptable virtual resource tokens comprising lower resource values first), in an ascending order (e.g., placing the acceptable virtual resource tokens comprising the higher resource values first), and/or the like.

As shown in block 408, the process flow 400 may include the step of receiving an accepted virtual resource token indication from the user, the accepted virtual resource token indication comprising a selected virtual resource token from the plurality of acceptable virtual resource tokens. In some embodiments, the virtual resource transfer device system may receive from a user device associated with the user, an accepted virtual resource token indication which may comprise a selected virtual resource token that the user selected from the plurality of acceptable virtual resource tokens. By way of non-limiting example, the user may select the accepted virtual resource tokens from the acceptable virtual resource tokens by indicating on the configured GUI of the user's device the virtual resource tokens the user would like to purchase.

As shown in block 410, the process flow 400 may include the step of generating the virtual resource transfer device associated with the selected virtual resource token. In some embodiments, the virtual resource transfer device system may generate the virtual resource transfer device based on the selected virtual resource token (or a plurality of selected virtual resource tokens). Similar to the process described above with respect to FIGS. 2 and 3, the virtual resource transfer device system may use the selected virtual resource tokens, and in those embodiments where the user already owns virtual resource tokens-use the already owned virtual resource tokens and the selected virtual resource tokens—to generate the virtual resource transfer device. By way of non-limiting example, each of the virtual resource tokens owned by the user (e.g., the virtual resource tokens previously owned and the selected virtual resource tokens) will be associated with the virtual resource transfer device for the user.

In some embodiments, a user may have a plurality of virtual resource transfer devices, where each virtual resource transfer device is associated with a single virtual resource token. By way of non-limiting example, each virtual resource transfer device and each associated virtual resource token may be used by the user in specific virtual environments, where each virtual environment may only accept one specific virtual resource token.

As shown in block 412, the process flow 400 may include the step of generating, based on a resource value of the selected virtual resource token, the resource transfer availability of the virtual resource transfer device. By way of non-limiting example, the virtual resource transfer device system may generate the resource transfer availability of the virtual resource transfer device based on at least the selected virtual resource token and its associated resource value. In some embodiments, and where the selected virtual resource token is aggregated with the already owned virtual resource tokens of the user for the virtual resource transfer device, the virtual resource transfer device system may base the resource transfer availability on the aggregate resource value of the selected virtual resource token(s) and the already owned virtual resource token(s). In some embodiments, and where the virtual resource transfer device is limited to a single virtual resource token, but where the user owns a plurality of already owned virtual resource tokens and a selected virtual resource token (or a plurality of selected virtual resource tokens), the virtual resource transfer device and its resource transfer availability may be based on the resource value for each virtual resource transfer tokens, individually.

FIG. 5 illustrates a process flow 500 for determining whether a resource transfer should be allowed based on a verified virtual resource token, in accordance with an embodiment of the invention. In some embodiments, a system (e.g., similar to one or more of the systems described herein with respect to FIGS. 1A-IC) may perform one or more of the steps of process flow 500. For example, n virtual resource transfer device system (e.g., the system 130 described herein with respect to FIGS. 1A-1C) may perform the steps of process flow 500.

As shown in block 502, the process flow 500 may include the step of receiving, from a device associated with the user, data associated with the virtual resource token of the virtual resource transfer device. In some embodiments, the virtual resource transfer device system may need to authenticate and/or verify that the user submitting the request for the resource transfer is the user associated with the virtual resource transfer device. In some embodiments, and to start a verification process, the virtual resource transfer device system may first receive data associated with the virtual resource token of the virtual resource transfer device. Such data may be received from a user device associated with the user before a resource transfer is requested (such as when the virtual resource transfer device is being generated and/or the virtual resource tokens are being determined for the user). In some embodiments, the virtual resource transfer device system may periodically update the data associated with the virtual resource token of the virtual resource transfer device whenever a new resource transfer request is submitted by the user. In this manner, the virtual resource transfer device system may keep up-to-date data on the virtual resource token for the user account and the virtual resource transfer device.

As shown in block 504, the process flow 500 may include the step of registering the virtual resource token of the virtual resource transfer device as a verified virtual resource token of the virtual resource transfer device. In some embodiments, and based on the data received that is associated with the virtual resource token, the virtual resource transfer device system may register and/or record the virtual resource token as a verified virtual resource token of the virtual resource transfer device, where the verification by the virtual resource transfer device system that is recorded may indicate that the virtual resource token has been pre-verified by the virtual resource transfer device system as an authentic virtual resource token owned by the user and used by the virtual resource transfer device. In some embodiments, the virtual resource transfer device system may track, record, and/or keep a distributed ledger comprising data regarding the virtual resource token (and its events, including past and current owners, transactions, increasing/decreasing of resolutions, and/or the like), the virtual resource transfer device (e.g., the virtual resource transfer device's events which may comprise data regarding its associated virtual resource token (s), the user account associated, and/or the like), and/or the user account(s) associated with the user.

In some embodiments, and as shown in block 506, the process flow 500 may include the step of receiving, from a device associated with the user, a request for a resource transfer associated with the virtual resource transfer device. In some embodiments—and based on the registered virtual resource token of the virtual resource transfer device-when the virtual resource transfer device is used in a request for a resource transfer, the virtual resource transfer device system may compare the verified virtual resource token against the virtual resource token associated with the request for the resource transfer. By way of non-limiting example, the virtual resource transfer device system may receive—from a user device associated with the user of the virtual resource transfer device-a request for a resource transfer, where such a request may be transmitted to the virtual resource transfer device system over a network (such as network 110). In some embodiments, the request for the resource transfer may comprise an indication of a resource transfer amount, a virtual resource transfer device (and associated account of the virtual resource transfer device for which the resource transfer is intended to be transmitted from), a virtual resource token associated with the virtual resource transfer device, a recipient account identifier of the resource transfer request, and/or the like.

In some embodiments, and as shown in block 508, the process flow 500 may include the step of receiving the virtual resource token associated with the virtual resource transfer device of the request for the resource transfer. By way of non-limiting example, the virtual resource transfer device system may receive the virtual resource token associated with the virtual resource transfer device at the time the request for the resource transfer is submitted by the user. For instance, the virtual resource token received may comprise the virtual resource token submitted with the virtual resource transfer device when the request for the resource transfer was submitted, which is the current rendering (e.g., resolution, virtual resource token image, and/or the like) of the virtual resource token at the time of the request. In some embodiments, and where the virtual resource token has changed since the last verification by the virtual resource transfer device system, such change may indicate to the virtual resource transfer device system that a different virtual resource token is attempted to be used with the virtual resource transfer device, which may indicate that misappropriation of the virtual resource transfer device is occurring and/or that the resource transfer availability has changed since the verification.

In some embodiments, and as shown in block 510, the process flow 500 may include the step of validating the virtual resource token associated with the virtual resource transfer device of the request for the resource transfer, wherein the validation of the virtual resource token comprises a comparison of the virtual resource token with the verified virtual resource token. In some embodiments, the virtual resource transfer device system may validate and/or authenticate that the virtual resource token associated with the request for the resource transfer is the same or similar to the verified virtual resource token such that the virtual resource transfer device system may guarantee that the user submitting the request for the resource transfer is the same user that owned the verified virtual resource token, and thus, is a verified user.

In some embodiments—and based on the comparison of the virtual resource token associated with the request for the resource transfer and the verified virtual resource token—the virtual resource transfer device system may proceed with the resource transfer, may continue to a second authentication process (e.g., like that described in FIGS. 6 and/or 7), and/or may deny the resource transfer.

In some embodiments, and as shown in block 512, the process flow 500 may include the step of determining whether a resource transfer is allowed. For instance, the virtual resource transfer device system may determine whether to allow or deny the resource transfer based on the comparison of the verified virtual resource token and the virtual resource token associated with the request for the resource transfer. Such a process is described in further detail below with respect to blocks 514 and 516.

In some embodiments, and as shown in block 514, the process flow 500 may include the step of denying the resource transfer in the instance where the virtual resource token does not match the verified virtual resource token. In some embodiments, the virtual resource transfer device system may deny the resource transfer when the virtual resource token (e.g., the image of the virtual resource token, the resolution and the image of the virtual resource token, and/or the like) does not exactly match the verified virtual resource token (e.g., the image of the verified virtual resource token, the image and the resolution of the verified virtual resource token, and/or the like). Such an exact matching must occur, in some embodiments, when the virtual resource transfer device system, a manger of the virtual resource transfer device system, and/or the user of the virtual resource transfer device has required the exact matching before a resource transfer can occur. For instance, and in some embodiments, the virtual resource transfer device system itself, the manager of the virtual resource transfer device system, and/or the user of the virtual resource transfer device, may preset certain authentication requirements which must be met before a resource transfer can occur. Such certain authentication requirements may include at least one of the processes described herein with respect to FIGS. 5, 6, and/or 7. In some embodiments, both of the authentication requirements described in FIGS. 5, 6, and 7 must occur for a resource transfer to be allowed.

In some embodiments, an exact matching of the virtual resource may not be required and instead only a similarity threshold may be needed to move forward with the resource transfer. However, and where the similarity threshold is not met (e.g., the virtual resource token of the request for the resource transfer is too dissimilar from the verified virtual resource token), the resource transfer may be denied. In some embodiments, the similarity threshold may be based on the difference in the resolution between the resolution of the virtual resource token and the verified virtual resource token (e.g., the virtual resource token comprises a resolution that is 10% different than the verified virtual resource token), but the image of the virtual resource token is the same as the verified virtual resource token. In some embodiments, and where the difference exceeds the similarity threshold, the virtual resource transfer device system may deny the resource transfer (e.g., where the resolution is greater than a 10% difference).

In some embodiments, and as shown in block 516, the process flow 500 may include the step of allowing the resource transfer in the instance where the virtual resource token does match the verified virtual resource token. In some embodiments, and where the virtual resource token associated with the request for the resource transfer is an exact match (e.g., exact same resolution and image) to the verified virtual resource token, the virtual resource transfer device system may allow the resource transfer. In some embodiments, and where an exact match is not necessary or required, but a similarity threshold may allow the resource transfer, the virtual resource transfer device system may determine that the similarity threshold has not been exceeded and/or met (between the virtual resource token and the verified virtual resource token) and may allow the resource transfer.

By way of non-limiting example, the virtual resource transfer device system—in allowing the resource transfer—may transfer the amount of the resource of the request for the resource transfer from an account associated with the user and/or virtual resource transfer device to a recipient account, where the recipient account may have been identified in the request for the resource transfer. However, and in some embodiments, such a resource transfer may only occur after the virtual resource transfer device system has determined the request for the resource transfer does not exceed the available resource of the virtual resource transfer device. Such an embodiment is described in further detail below with respect to FIG. 7.

FIG. 6 illustrates a process flow 600 for determining whether a resource transfer should be allowed based on a verified device identifier, in accordance with an embodiment of the invention. In some embodiments, a system (e.g., similar to one or more of the systems described herein with respect to FIGS. 1A-IC) may perform one or more of the steps of process flow 600. For example, the virtual resource transfer device system (e.g., the system 130 described herein with respect to FIGS. 1A-IC) may perform the steps of process flow 600.

As shown in block 602, the process flow 600 may include the step of receiving, from a device associated with the user, a device identifier of the device associated with the virtual resource transfer device. In some embodiments, the virtual resource transfer device system may receive a device identifier of the device associated with the user, user account, and/or the virtual resource transfer device such that the virtual resource transfer device system may use the device identifier to later verify and/or authenticate that a request for a resource transfer is coming from an authenticated device. By way of non-limiting example, the virtual resource transfer device system may receive the device identifier based on a message, data transmission, and/or the like from the device, where the message and/or data transmission comprises data identifying the user, the user account, and/or the virtual resource transfer device for registration of the device and a device identifier of the device transmitting the data. In this manner, the system may register the device identifier with the specific user, user account, and/or virtual resource transfer device for later authentication. In some embodiments, the virtual resource transfer device system may periodically update its record of verified device identifiers based on such data transmissions.

As shown in block 604, the process flow 600 may include the step of registering the device identifier as a verified device identifier in associated with at least one of the user or the virtual resource transfer device. By way of non-limiting example, the virtual resource transfer device system may register the device identifier received as a verified device identifier based on an identification of the device and its data transmission of at least one of data comprising and/or identifying a user, a user account, and/or a virtual resource transfer device. Based on the data transmission, the virtual resource transfer device system may determine that the device used in the data transmission is a trusted device for the virtual resource transfer device and for future resource transfers, which may allow the virtual resource transfer device system to register the device identifier as a verified device identifier.

In some embodiments, and as shown in block 606, the process flow 600 may include the step of receiving, from a device associated with a request for a resource transfer, the request for the resource transfer associated with the virtual resource transfer device. By way of non-limiting example, the virtual resource transfer device system may receive a request for a resource transfer at a subsequent time after registering at least one device identifier as a verified device identifier for the user, user account, and/or the virtual resource transfer device, where the request may come from a device comprising the same device identifier as the verified device identifier or a device comprising a different device identifier as the verified device identifier. In some embodiments—and based on the device identifier comprised within the request (herein called the request device identifier)—the virtual resource transfer device system may determine whether to allow the resource transfer.

In some embodiments, and as shown in block 608, the process flow 600 may include the step of receiving a request device identifier based on the device associated with the request for the resource transfer. Such a request device identifier may comprise, in some embodiments, a device identifier that is unique to the device used in generating and/or transmitting the request for the resource transfer to the virtual resource transfer device system. In some embodiments, the virtual resource transfer device system may save the request device identifier to its records automatically.

In some embodiments, and as shown in block 610, the process flow 600 may include the step of comparing the request device identifier and the verified device identifier. By way of non-limiting example, the virtual resource transfer device system may compare the request device identifier and the verified device identifier to determine whether the request device identifier and the verified device identifier exactly match. In some embodiments and depending on whether the request device identifier and the verified device identifier do match, the virtual resource transfer device system may allow or deny the resource transfer.

In some embodiments, and as shown in block 612, the process flow 600 may include the step of determining whether a resource transfer is allowed. By way of non-limiting example, the virtual resource transfer device system may determine, based on the comparison of the request device identifier and the verified device identifier, whether to automatically allow, automatically deny, or request further user interaction for the resource transfer.

In some embodiments, and as shown in block 614, the process flow 600 may include the step of denying the resource transfer in the instance where the request device identifier does not match the verified device identifier. By way of non-limiting example, if the request device identifier does not exactly match the verified device identifier, then the virtual resource transfer device system may automatically deny the resource transfer. In some embodiments, the virtual resource transfer device system may transmit a resource transfer denial interface component to configure a GUI of the user device that transmitted the request for the resource transfer, a resource transfer denial interface component to the device associated with the verified device identifier to configure the GUI, a resource transfer denial interface component to a device associated with the manager of the virtual resource transfer device system to configure the GUI, and/or the like. By way of non-limiting example, the resource transfer denial interface component may comprise data regarding the denial of the resource transfers, including the reason why such denial was output.

In some embodiments, the virtual resource transfer device system may allow the resource transfer-even after an automatic denial—where the virtual resource transfer device system transmits the resource transfer denial interface component to the device associated with the verified device identifier and receives an input of the user of the verified device to allow the resource transfer. Such an authentication by the verified device from the user may allow the resource transfer to be allowed. In some embodiments, such an authentication may also lead the virtual resource transfer device system to save the request device identifier as a verified device identifier for future use in allowing or denying resource transfers.

In some embodiments, and as shown in block 616, the process flow 600 may include the step of allowing the resource transfer in the instance where the request device identifier does match the verified device identifier. In some embodiments, and where request device identifier exactly matches the verified device identifier, the virtual resource transfer device system may automatically allow the resource transfer. However, and in some embodiments, such a resource transfer may only occur after the virtual resource transfer device system has determined the request for the resource transfer does not exceed the available resource of the virtual resource transfer device. Such an embodiment is described in further detail below with respect to FIG. 7.

FIG. 7 illustrates a process flow 700 for allowing a resource transfer based on a determination that the request for the resource transfer does not exceed the available resource of the virtual resource transfer device, in accordance with an embodiment of the invention. In some embodiments, a system (e.g., similar to one or more of the systems described herein with respect to FIGS. 1A-IC) may perform one or more of the steps of process flow 700. For example, a virtual resource transfer device system (e.g., the system 130 described herein with respect to FIGS. 1A-IC) may perform the steps of process flow 700.

As shown in block 702, the process flow 700 may include the step of receiving, from a user device associated with the user, a request for the resource transfer. In some embodiments, the virtual resource transfer device system may receive a request for the resource transfer from a user device associated with the user of the virtual resource transfer device. By way of non-limiting example, the request for the resource transfer may identify the user, the user account, and/or the virtual resource transfer device the user would like to use to fulfil the resource transfer. In some embodiments, and based on the request for the resource transfer, the virtual resource transfer device system may determine whether the request for the resource transfer does not exceed the available resource of the virtual resource transfer device and may be allowed.

As shown in block 704, the process flow 700 may include the step of determining an available resource of the virtual resource transfer device. In some embodiments, the virtual resource transfer device system may determine an available resource of the virtual resource transfer device based on at least the resource transfer availability determined by the virtual resource transfer device system. In some embodiments, and where a portion of the resources of the resource transfer availability has been used and/or already transferred, an updated resource amount that is available for resource transfer may be determined by the system as an available resource. Such an available resource of the virtual resource transfer device may be used currently by the user through the virtual resource transfer device.

As shown in block 706, the process flow 700 may include the step of verifying the request for the resource transfer does not exceed the available resource of the virtual resource transfer device. In some embodiments, the virtual resource transfer device system may verify the request for the resource transfer does not exceed the available resource of the virtual transfer device by comparing the request for the resource transfer (such as an amount of the request for the resource transfer) against the available resource (e.g., an amount that is available for resource transfer by the virtual resource transfer device). Based on this comparison, the virtual resource transfer device system may allow or deny the resource transfer. For instance, and where the request for the resource transfer only meets, but does not exceed, the available resource, the virtual resource transfer device system may allow the resource transfer. However, and where the request for the resource transfer exceeds the available resource, the virtual resource transfer device system may deny the resource transfer. In some embodiments, and where the virtual resource transfer device system denies the resource transfer, a denial interface component may be generated by the virtual resource transfer device system and transmitted to at least one of a device associated with the request for the resource transfer, a device associated with a manager of the virtual resource transfer device, and/or the like. In some embodiments, the denial interface component may comprise data regarding the denial of the resource transfer and may be used to configure the GUI of the recipient device.

As shown in block 708, the process flow 700 may include the step of allowing, based on the verification and the request for the resource transfer does not exceed the available resource of the virtual resource transfer device, the resource transfer. By way of non-limiting example, the virtual resource transfer device system may allow—where the virtual resource transfer device system has verified that the request for the resource transfer does not exceed the available resource—the resource transfer to be transmitted to the recipient account identified in the request for the resource transfer. In some embodiments, such a resource transfer may occur automatically after the virtual resource transfer device system has verified the request for the resource transfer does not exceed the available resource.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These computer-executable program code portions execute via the processor of the computer and/or other programmable data processing apparatus and create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:
1. A system for implementing and authenticating a virtual resource transfer device, the system comprising:
  a memory device with computer-readable program code stored thereon;
  at least one processing device operatively coupled to the at least one memory device and at least one commu- nication device, wherein executing the computer-readable code is configured to cause the at least one processing device to:
receive data associated with a virtual resource token owned by a user, wherein the virtual resource token is a non-fungible token (NFT) comprising an image;
determine a resource value of the virtual resource token, wherein the resource value is determined based on at least one of a resource transfer associated with the virtual resource token, a real-time resource value of the virtual resource token, a resource value provided by an entity associated with the virtual resource transfer device, or a resource value provided by an entity associated with the virtual resource token;
determine a current resolution of the virtual resource token based on a current number of pixels in the image;
dynamically update, based on the current resolution of the virtual resource token, the resource value of the virtual resource transfer device;
generate a virtual resource transfer device associated with the virtual resource token; and
generate, based on the updated resource value of the virtual resource token, a resource transfer availability of the virtual resource transfer device.

2. The system of claim 1, wherein the processing device is further configured to:
receive an indication of a plurality of virtual resource tokens owned by the user;
determine an aggregate resource value of the plurality of virtual resource tokens; and
dynamically update, based on the aggregate resource value of the plurality of virtual resource tokens, the resource transfer availability of the virtual resource transfer device.

3. The system of claim 1, wherein the processing device is further configured to:
receive a real-time resource availability data associated with the user, the real-time resource availability data comprising a plurality of currently owned resources of the user;
receive a plurality of available virtual resource tokens;
generate, based on the plurality of available virtual resource tokens, a plurality of acceptable virtual resource tokens to present to the user based on the real-time resource availability data;
receive an accepted virtual resource token indication from the user, the accepted virtual resource token indication comprising a selected virtual resource token from the plurality of acceptable virtual resource tokens;
generate the virtual resource transfer device associated with the selected virtual resource token; and
generate, based on a resource value of the of the selected virtual resource token, the resource transfer availability of the virtual resource transfer device.

4. The system of claim 1, wherein the processing device is further configured to:
receive, from a device associated with the user, data associated with the virtual resource token of the virtual resource transfer device; and
register the virtual resource token of the virtual resource transfer device as a verified virtual resource token of the virtual resource transfer device, wherein the register comprises a record of the virtual resource token, the virtual resource transfer device, and a user account associated with the user.

5. The system of claim 4, wherein the processing device is configured to:
receive, from a device associated with the user, a request for a resource transfer associated with the virtual resource transfer device;
receive the virtual resource token associated with the virtual resource transfer device of the request for the resource transfer;
validate the virtual resource token associated with the virtual resource transfer device of the request for the resource transfer, wherein the validation of the virtual resource token comprises a comparison of the virtual resource token with the verified virtual resource token; and
determine whether a resource transfer is allowed,
wherein, in an instance where the virtual resource token does not match the verified virtual resource token, deny the resource transfer, or
wherein, in an instance where the virtual resource token does match the verified virtual resource token, allow the resource transfer.

6. The system of claim 1, wherein the processing device is further configured to:
receive, from a device associated with the virtual resource transfer device, a device identifier of the device associated with the virtual resource transfer device; and
register the device identifier as a verified device identifier in association with at least one of the user or the virtual resource transfer device.

7. The system of claim 6, wherein the processing device is further configured to:
receive, from a device associated with a request for a resource transfer, the request for the resource transfer associated with the virtual resource transfer device;
receive a request device identifier based on the device associated with the request for the resource transfer;
compare the request device identifier and the verified device identifier; and
determine whether the resource is allowed,
wherein, in an instance where the request device identifier does not match the verified device identifier, deny the resource transfer, or
wherein, in an instance where the request device identifier does match the verified device identifier, allow the resource transfer.

8. The system of claim 1, wherein the processing device is further configured to:
receive, from a user device associated with the user, a request for the resource transfer;
determine an available resource of the virtual resource transfer device;
verify the request for the resource transfer does not exceed the available resource of the virtual resource transfer device; and
allow, based on the verification the request for the resource transfer does not exceed the available resource of the virtual resource transfer device, the resource transfer.

9. The system of claim 1, wherein the current resolution of the virtual resource token automatically changes over a lifetime of the virtual resource token.

10. The system of claim 1, wherein the processing device is further configured to:
automatically update, in an instance where the virtual resource token undergoes a devaluation, the current resolution of the virtual resource token with a decrease in pixels.

11. A computer program product for implementing and authenticating a virtual resource transfer device, wherein the computer program product comprises at least one non-transitory computer-readable medium having computer-readable program code portions embodied therein, the computer-readable program code portions which when executed by a processing device are configured to cause the processor to:
  receive data associated with a virtual resource token owned by a user, wherein the virtual resource token is a non-fungible token (NFT) comprising an image;
  determine a resource value of the virtual resource token, wherein the resource value is determined based on at least one of a resource transfer associated with the virtual resource token, a real-time resource value of the virtual resource token, a resource value provided by an entity associated with the virtual resource transfer device, or a resource value provided by an entity associated with the virtual resource token;
  determine a current resolution of the virtual resource token based on a current number of pixels in the image;
  dynamically update, based on the current resolution of the virtual resource token, the resource value of the virtual resource transfer device;
  generate a virtual resource transfer device associated with the virtual resource token; and
  generate, based on the updated resource value of the virtual resource token, a resource transfer availability of the virtual resource transfer device.

12. The computer program product of claim 11, wherein the processing device is further configured to:
  receive an indication of a plurality of virtual resource tokens owned by the user;
  determine an aggregate resource value of the plurality of virtual resource tokens; and
  dynamically update, based on the aggregate resource value of the plurality of virtual resource tokens, the resource transfer availability of the virtual resource transfer device.

13. The computer program product of claim 11, wherein the processing device is further configured to:
  receive a real-time resource availability data associated with the user, the real-time resource availability data comprising a plurality of currently owned resources of the user;
  receive a plurality of available virtual resource tokens;
  generate, based on the plurality of available virtual resource tokens, a plurality of acceptable virtual resource tokens to present to the user based on the real-time resource availability data;
  receive an accepted virtual resource token indication from the user, the accepted virtual resource token indication comprising a selected virtual resource token from the plurality of acceptable virtual resource tokens;
  generate the virtual resource transfer device associated with the selected virtual resource token; and
  generate, based on a resource value of the of the selected virtual resource token, the resource transfer availability of the virtual resource transfer device.

14. The computer program product of claim 11, wherein the processing device is further configured to:
  receive, from a device associated with the user, data associated with the virtual resource token of the virtual resource transfer device; and
  register the virtual resource token of the virtual resource transfer device as a verified virtual resource token of the virtual resource transfer device, wherein the register comprises a record of the virtual resource token, the virtual resource transfer device, and a user account associated with the user.

15. The computer program product of claim 11, wherein the processing device is further configured to:
  receive, from a user device associated with the user, a request for the resource transfer;
  determine an available resource of the virtual resource transfer device;
  verify the request for the resource transfer does not exceed the available resource of the virtual resource transfer device; and
  allow, based on the verification the request for the resource transfer does not exceed the available resource of the virtual resource transfer device, the resource transfer.

16. A computer-implemented method for implementing and authenticating a virtual resource transfer device, the computer-implemented method comprising:
  receiving data associated with a virtual resource token owned by a user, wherein the virtual resource token is a non-fungible token (NFT) comprising an image;
  determining a resource value of the virtual resource token, wherein the resource value is determined based on at least one of a resource transfer associated with the virtual resource token, a real-time resource value of the virtual resource token, a resource value provided by an entity associated with the virtual resource transfer device, or a resource value provided by an entity associated with the virtual resource token;
  determining a current resolution of the virtual resource token based on a current number of pixels in the image;
  dynamically updating, based on the current resolution of the virtual resource token, the resource value of the virtual resource transfer device;
  generating a virtual resource transfer device associated with the virtual resource token; and
  generating, based on the updated resource value of the virtual resource token, a resource transfer availability of the virtual resource transfer device.

17. The computer-implemented method of claim 16, further comprising:
  receiving an indication of a plurality of virtual resource tokens owned by the user;
  determining an aggregate resource value of the plurality of virtual resource tokens; and
  dynamically updating, based on the aggregate resource value of the plurality of virtual resource tokens, the resource transfer availability of the virtual resource transfer device.

18. The computer-implemented method of claim 16, further comprising:
  receiving a real-time resource availability data associated with the user, the real-time resource availability data comprising a plurality of currently owned resources of the user;
  receiving a plurality of available virtual resource tokens;
  generating, based on the plurality of available virtual resource tokens, a plurality of acceptable virtual resource tokens to present to the user based on the real-time resource availability data;
  receiving an accepted virtual resource token indication from the user, the accepted virtual resource token indication comprising a selected virtual resource token from the plurality of acceptable virtual resource tokens;
  generating the virtual resource transfer device associated with the selected virtual resource token; and generating, based on a resource value of the of the selected virtual resource token, the resource transfer availability of the virtual resource transfer device.

19. The computer-implemented method of claim 16, further comprising:
receiving, from a device associated with the user, data associated with the virtual resource token of the virtual resource transfer device; and
registering the virtual resource token of the virtual resource transfer device as a verified virtual resource token of the virtual resource transfer device, wherein the registration comprises a record of the virtual resource token, the virtual resource transfer device, and a user account associated with the user.

\* \* \* \* \*